(12) United States Patent
Pabon et al.

(10) Patent No.: US 7,334,661 B2
(45) Date of Patent: Feb. 26, 2008

(54) ACOUSTIC LOGGING TOOL SLEEVE (75) Inventors: Jahir Pabon, Brookfield, CT (US); Chung Chang, Wilton, CT (US); David L. Johnson, Bethel, CT (US); Vivian Pistre, Tokyo (JP); Tarek Habashy, Danbury, CT (US); Smaine Zeroug, Ridgefield, CT (US); Toshihiro Kinoshita, Sagamihara (JP); Hitoshi Sugiyama, Sagamihara (JP); Hiroshi Hori, Sagamihara (JP); Atsushi Saito, Sagamihara (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 371 days.

(21) Appl. No.: 10/772,634

(22) Filed: Feb. 5, 2004

(65) Prior Publication Data

US 2005/0173185 A1 Aug. 11, 2005

(51) Int. Cl.
*G01V 1/16* (2006.01)
(52) U.S. Cl. ............... 181/108; 181/102; 181/111; 181/112; 181/122
(58) Field of Classification Search ... 166/249–250.17; 181/102, 108, 111, 112, 122
See application file for complete search history.

(56) References Cited

U.S. PATENT DOCUMENTS

| 3,244,253 | A | | 4/1966 | Blizard |
| 4,850,450 | A | | 7/1989 | Hoyle et al. |
| 4,872,526 | A | * | 10/1989 | Wignall et al. ............ 181/102 |
| 4,872,825 | A | | 10/1989 | Ross |
| 5,036,945 | A | * | 8/1991 | Hoyle et al. ................ 181/104 |
| RE33,837 | E | * | 3/1992 | Chung et al. ................ 367/31 |
| 5,796,677 | A | * | 8/1998 | Kostek et al. ............... 367/25 |
| 6,050,141 | A | | 4/2000 | Tello et al. |
| 6,474,439 | B1 | | 11/2002 | Hoyle et al. |
| 6,494,288 | B1 | | 12/2002 | Tashiro et al. |
| 6,535,458 | B2 | * | 3/2003 | Meehan ....................... 367/81 |
| 6,564,899 | B1 | * | 5/2003 | Arian et al. ............... 181/102 |
| 6,671,224 | B1 | * | 12/2003 | Pabon ......................... 367/82 |
| 6,899,197 | B2 | * | 5/2005 | Arian et al. ............... 181/102 |
| 2002/0080682 | A1 | * | 6/2002 | Meehan ....................... 367/81 |
| 2003/0106739 | A1 | * | 6/2003 | Arian et al. ............... 181/110 |

FOREIGN PATENT DOCUMENTS

WO WO 02/41034 5/2002

* cited by examiner

*Primary Examiner*—Lincoln Donovan
*Assistant Examiner*—Jeremy Luks
(74) *Attorney, Agent, or Firm*—Karan Singh; Jaime Castano; Dale Gaudier (57) ABSTRACT

An acoustic logging tool sleeve with a preferably discontinuous, alternating structure that is acoustically opaque in some zones, and acoustically transparent in others. The sleeve may be modular, with several stages connected together. The multiple stages provide a sleeve that may be useful with a variety of borehole logging tools to reduce or eliminate the transmission of noise to the receiving elements.

47 Claims, 7 Drawing Sheets

ACOUSTIC LOGGING TOOL SLEEVE

FIELD OF THE INVENTION

The present invention relates generally to methods for investigating subsurface formations using sonic measurements made in a borehole. More particularly, this invention is directed to an acoustic logging tool sleeve.

BACKGROUND OF THE INVENTION

The generation and recording of borehole acoustic waves is a key measurement employed in oilfield wellbore logging. Many wellbore tools and methods are currently available for taking acoustic measurements. Some tools include a single source of acoustic energy and two or more receivers; however, most of the tools now include many receivers arranged in an array. While the currently available acoustic tools are useful in providing a large range of information regarding the adjacent formation and the borehole parameters, a primary use of acoustic borehole measurements is the estimation of formation slowness. Usually the measurements are taken in the sonic domain, with frequencies typically in the range of 500 Hz to 25 kHz.

Compressional or extensional wave formation slowness is typically estimated using travel times acquired via a motion detection process. In the case of a single source, two receiver tool suggested by the prior art, formation slowness is estimated by subtracting the arrival times between two receivers and dividing by the inter-receiver spacing. This estimate, however, is subject to inaccuracies due to tool tilt, borehole washouts, bed boundary effects, etc. Additional acoustic sources and receivers and more robust methods such as STC (Slowness-Time-Coherency analysis) among others have been used to reduce the inaccuracies introduced by such environmental effects.

Figure 1:
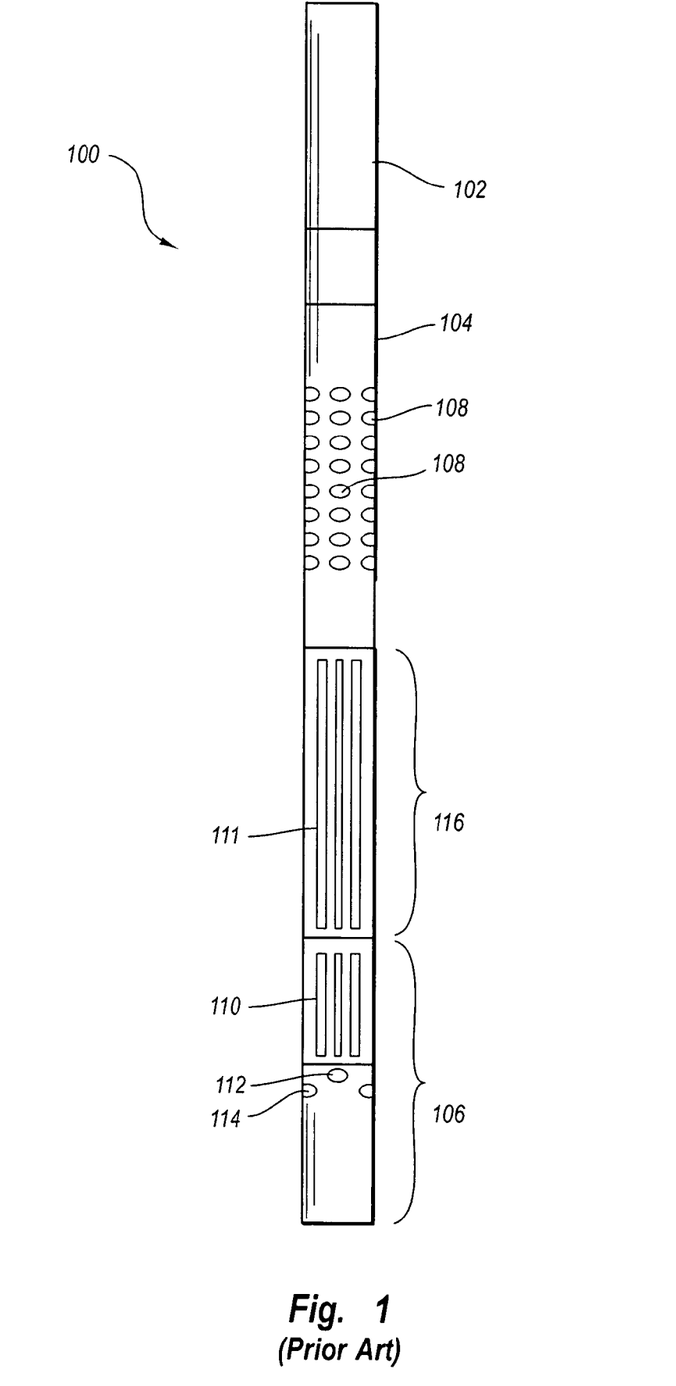
FIG. 1 is a front elevational view of a sonic logging tool according to the prior art.

One example of a sonic tool according the prior art is shown in FIG. 1. FIG. 1 illustrates a Dipole Sonic Imaging (DSI) tool (100). The DSI tool (100) includes a processing and telemetry cartridge (102), a sonic receiver section (104), and a sonic transmitter section (106). The processing and telemetry cartridge (102) may include a computer processor for controlling the firing of sonic transmitters from the sonic transmitter section (106), the receipt of waveform measurements by the sonic receiver section (104), and communication to uphole controls and equipment.

As shown in FIG. 1, the sonic receiver section (104) includes an array of individual sonic receivers (108). The sonic transmitter section (106) includes a monopole transmitter (110), and upper and lower dipole transmitters (112, 114), respectively. The monopole transmitter (110) and the upper and lower dipole transmitters (112, 114), as well as the sonic receivers (108), facilitate compressional and shear measurements through adjacent formations. The tool (100) may operate in several data acquisition modes to acquire different waveforms. The modes may include upper and lower dipole modes, crossed dipole mode, Stoneley mode, P and S wave modes, and first motion mode.

However, a common problem encountered with sonic logging is the propagation of generated signals along the tool (100) itself. The signals propagating along the tool (100) are commonly known as a "tool arrivals" and are considered "noise" that can interfere with the detection of signals corresponding to the formation. Therefore, a number of approaches have been taken to remove or reduce tool arrivals. The most common approach to reducing the effects of tool arrivals is to insert an isolator between the transmitter section (106) and the receiver section (104) as shown in FIG. 1. The intent of the isolator is to prevent, attenuate, and/or delay propagation of the tool arrival. According to FIG. 1, the isolator is an isolation joint (116), further described in U.S. Pat. Nos. 4,872,825 and 5,036,945.

Additionally, during sonic logging there is a recoupling of signals from the borehole into the tool (100). Because of this recoupling, it is helpful to design a slow and/or highly damped receiver section so that the recoupled tool signals do not interfere with the formation signals. According to FIG. 1, the receiver section (104) includes a slotted sleeve (111) that functions as a slow structural member. The slotted sleeve (111) is further described in U.S. Pat. Nos. 4,850,450 and 6,494,288. The slotted sleeve (111) usually provides the mechanical strength necessary for sonic logging operations and reduces tool arrivals. However, it is very difficult or impossible to use the slotted sleeve (111) and measure formation slowness greater than about 700 µs/ft, especially while maintaining sufficient mechanical strength. Further, certain borehole modes, such as Stoneley and leaky compressional (P) modes, are not efficiently excited because of the non-smooth surface of the slotted sleeve (111).

The slotted sleeve (111) also typically houses and mechanically protects the individual sonic receivers (108) and associated electronics. And although the slotted sleeve housings provide acoustic delays between the transmitter and receiver elements, they simultaneously provide detrimental acoustic reflections and other undesirable secondary acoustic energy or noise in the vicinity of the receivers.

The undesirable secondary acoustic energy, or noise, is developed primarily due to the discontinuous pattern formed in the housing section surrounding the receivers. Sound waves traveling along the tortuous path of the slotted sleeve housings develop reflected scatter patterns when interfacing with the change in pattern from the discontinuous slots to the open rectangular windows about or in the vicinity of the receivers. Additional noise is developed in the prior housings due to the "ringing" of the short cylindrical elements that make up the slotted sleeve. The noise produced inherently by the design of the prior slotted sleeve housings limits their effectiveness, especially in full wave form logging operations in wide frequency band.

Because none of the prior approaches has been completely successful in removing interfering signals and providing adequate mechanical strength, the present invention is directed to overcoming, or at least reducing the effects of, one or more of the problems outlined above.

SUMMARY OF THE INVENTION

The present invention meets the above-described needs and others. Specifically, the present invention provides an apparatus for protecting acoustic sensors, electronics and/or other logging tool components while improving a logging tool's acoustic properties. The present invention introduces a sleeve with a preferably discontinuous, alternating structure that is acoustically opaque in some zones, and acoustically transparent in others. The sleeve may be modular, with several stages connected together. The multiple stages provide a sleeve that may be useful with a variety of borehole logging tools.

According to some embodiments, the present invention provides a downhole acoustic tool apparatus comprising an acoustic source section and an acoustic receiver section. The acoustic receiver section includes a central mandrel and an outer sleeve with alternating zones of high and low acoustic impedance. The high and low acoustic impedance preferably differs by a factor of ten or more, and may differ by at least a factor of two. The acoustic receiver section may include one or more acoustic receivers attached to the mandrel and housed by the outer sleeve. The receivers are preferably aligned with one of the alternating zones of low impedance, which comprise an acoustic impedance substantially matching the borehole fluid.

According to some embodiments, there is a volume of oil disposed in an annulus between the central mandrel and the outer sleeve, the oil comprising an acoustic impedance substantially matching the borehole fluid and balancing the hydrostatic pressure inside and outside of the outer sleeve.

According to some embodiments, the receivers are attached indirectly to the mandrel via a plurality of mass blocks directly attached about the mandrel. Accordingly, the mass blocks may have an inner diameter bearing against an outer surface of the mandrel in an interference fit. The mandrel and mass blocks may function as a mass/spring system and provide a low pass filter to suppress tool arrivals, facilitating a clean logging bandwidth of frequencies between 500 Hz and 25 kHz.

According to some embodiments, the outer sleeve comprises a plurality of modules. Each of the plurality of modules includes a first hollow metallic cylinder, a first supporting ring coaxial with and attached to the first hollow metallic cylinder, a second supporting ring coaxial with and spaced axially from the first support ring, and a second hollow cylinder comprising elastomer, resin, or both elastomer and resin disposed between the first and second supporting rings.

According to other embodiments, the outer sleeve comprises an elastomeric and/or resin pipe with at least two metal rings attached thereto, the at least two metal rings being spaced from one another. The metal rings are disposed in mating recesses along an internal surface of the resin pipe according to some embodiments. However, the metal rings are adhered to and protrude from an internal or external surface of the resin pipe according to other embodiments.

Another aspect of the invention provides a sonic receiver sonde. The sonde includes a mandrel, a plurality of spaced mass blocks attached to the mandrel, a plurality of sonic receivers disposed in at least one of the plurality of spaced mass blocks, and an outer sleeve covering the plurality of spaced mass blocks and sonic receivers. The outer sleeve comprises first and second zones, the first zone having an acoustic impedance at least twice as high as the second zone. According to some embodiments, the second zone is substantially acoustically transparent and is axially aligned with the plurality of sonic receivers.

According to one aspect of the sonde, the first and second zones comprise alternating circumferentially continuous bands. The first zone is a metal band and the second zone comprises an elastomeric band. For example, the first zone may be a steel band and the second zone may be a plastic band. An outer surface of the outer sleeve, including both the first and second zones, is acoustically smooth relative to a wavelength of sonic signals received by the sonic receivers.

According to another aspect of the sonde, the outer sleeve comprises a plurality of sleeve modules. Each of the sleeve modules may include a first hollow metallic cylinder, a second hollow cylinder comprising elastomer, resin, or both elastomer and resin, and first and second supporting rings. According to other aspects of the sonde, the outer sleeve is not modular and comprises a resin pipe with at least two metal rings attached thereto, the at least two metal rings being spaced from one another.

Another aspect of the invention provides a sonic receiver sleeve. The sonic receiver sleeve may include a first hollow metallic cylinder, a first supporting ring coaxial with and attached to the first hollow metallic cylinder, a second supporting ring coaxial with and spaced axially from the first support ring, and a second hollow cylinder comprising elastomer, resin, or both elastomer and resin disposed between the first and second supporting rings. The sleeve may further include a third hollow metallic cylinder attached to the second supporting ring opposite of the second hollow cylinder, a third supporting ring coaxial with and attached to the third hollow metallic cylinder, a fourth supporting ring coaxial with and spaced axially from the third support ring; and a fourth hollow cylinder comprising elastomer, resin, or both elastomer and resin disposed between the first and second supporting rings. The second and fourth hollow cylinders are preferably aligned with sonic receivers of a sonic logging tool, and the first and third hollow metallic cylinders each comprise an acoustic impedance at least twice as high as the second and fourth hollow cylinders.

The invention also provides an acoustic receiver sonde comprising a central rigid mandrel, a plurality of spaced receiver blocks rigidly attached about the mandrel, a plurality of acoustic receivers attached to each of the plurality of spaced receiver blocks, and a plurality of axially discontinuous, circumferentially continuous alternating acoustic impedance zones covering the plurality of spaced receiver blocks and acoustic receivers. The alternating impedance zones differ by at least a factor of two.

Additional advantages and novel features of the invention will be set forth in the description which follows or may be learned by those skilled in the art through reading these materials or practicing the invention. The advantages of the invention may be achieved through the means recited in the attached claims.

BRIEF DESCRIPTION OF THE DRAWINGS

The accompanying drawings illustrate preferred embodiments of the present invention and are a part of the specification. Together with the following description, the drawings demonstrate and explain the principles of the present invention.

Throughout the drawings, identical reference numbers designate similar, but not necessarily identical, elements.

DETAILED DESCRIPTION OF THE PREFERRED EMBODIMENTS

Illustrative embodiments and aspects of the invention are described below. It will of course be appreciated that in the development of any such actual embodiment, numerous implementation-specific decisions must be made to achieve the developers' specific goals, such as compliance with system-related and business-related constraints that will vary from one implementation to another. Moreover, it will be appreciated that such a development effort might be complex and time-consuming, but would nevertheless be a routine undertaking for those of ordinary skill in the art having the benefit of this disclosure.

The present invention contemplates acoustic logging apparatus with receiver sondes having high tensile, compressional, and torsional strength. The receiver sondes of the present invention are designed to improve the acoustic properties of the apparatus as compared to conventional receiver sections. Therefore, the apparatus may include a sleeve that protects sensitive components of the logging apparatus from borehole environments and reduces or eliminates the transmission of noise to acoustic receivers. The sleeve may provide alternating zones of different acoustic impedance to reduce or eliminate noise. The principles described herein facilitate acoustic logging across the full range of sonic frequencies and among all the useful sonic modes, including monopole and dipole modes, Stoneley modes, pseudo-Rayleigh modes, and leaky compressional modes.

As used throughout the specification and claims, the term "mandrel" is used broadly to encompass a shaft, rod, or axle on which a working tool or working tool components are mounted. The term "sonic" refers to acoustic or sound waves having a frequency range between approximately 500 Hz and 25 kHz. The term "acoustic impedance" is defined as the product of density and seismic velocity, commonly symbolized by Z. Acoustic impedance of plural material is the volumetric average of the different materials. "Acoustic transparency" is the quality of a medium whose acoustic impedance is substantially constant throughout. Accordingly, an "acoustically transparent" medium as used below may include a medium whose acoustic impedance is the same or substantially the same as the acoustic impedance of borehole fluid. Similarly, an "acoustically opaque" medium is a medium with a substantially different acoustic impedance than the acoustic impedance of the borehole fluid. The terms "elastomer" or "elastomeric" refer to any of various polymers that have properties resembling rubber, and also includes plastic materials. "Plastic" refers to any of various organic compounds produced by polymerization. "High" and "low" are relativity indicators and not necessarily limited to any quantitative range. The words "including" and "having," as used in the specification, including the claims, have the same meaning as the word "comprising."

Figure 2:
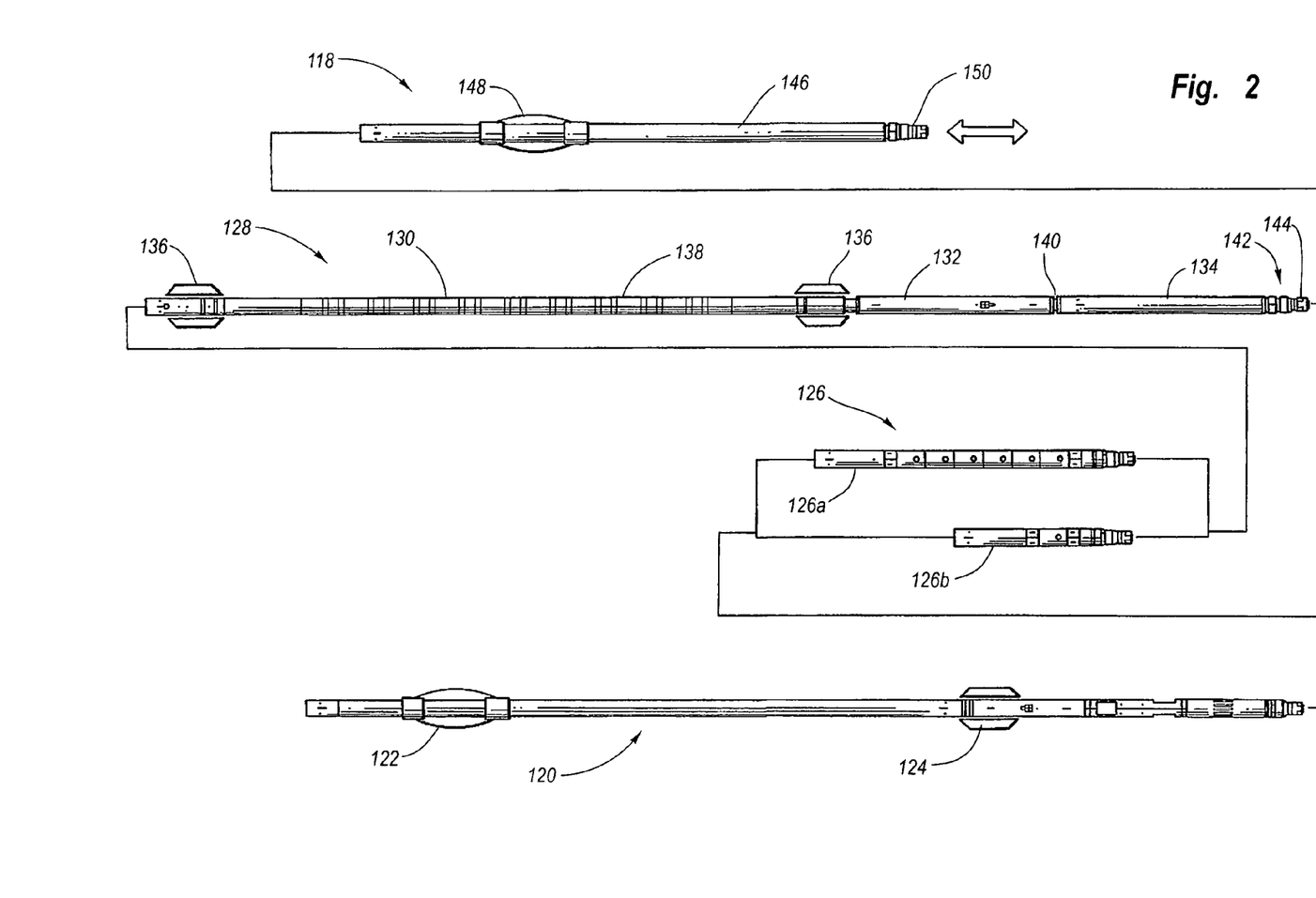
FIG. 2 is an assembly view of an acoustic logging tool according to one embodiment of the present invention.

Turning now to the figures, and in particular to FIG. 2, a downhole acoustic tool apparatus, for example a sonic logging tool (118), is shown according principles of the present invention. As with many sonic tools, the sonic logging tool (118) is used for logging a borehole by taking various waveform measurements and communicating the measurements uphole. The sonic logging tool (118) therefore includes a sonic transmitter section (120) including electronics and drive circuitry for sonic sources contained in the sonic transmitter section (120). The sonic transmitter section (120) is described in more detail below with reference to FIG. 3 and provides a source of sonic energy. As shown, the sonic transmitter section (120) may include a centralizer (122) and a standoff (124).

According to the embodiment of FIG. 2, a spacer section (126) is connected to the sonic transmitter section (120) uphole of the sonic transmitter section (120). The spacer section (126) may comprise various lengths, two of which are illustrated in FIG. 2, a long section (126*a*) and a short section (126*b*). The length of the spacer section (126) may be selected according to the expected acoustic behavior of the formation to be logged.

The spacer section (126) is connected uphole to an acoustic receiver section or sonde (128). According to the embodiment shown, the acoustic receiver sonde (128) may include a receiver and near monopole transmitter section (130), an oil volume compensator (132), and a receiver sonde electronics package (134), which may include a pair of elastomeric standoffs or spacers (136). The receiver and near monopole transmitter section (130) is enclosed by an outer sleeve (138), which is described in more detail below with reference to FIGS. 4-6B.

The receiver sonde electronics package (134) is connected uphole of the oil volume compensator (132) as shown and may include front end power supplies and step up transformers (not shown) for the monopole sources. A feedthrough (140) is provided to facilitate power and communications transfer between the various sections of the receiver sonde (130). A first or upper end (142) of the receiver sonde (130) may also include feed thrus (144) for connection to a master electronics cartridge (146). The master electronics cartridge (146) may include a centralizer (148) and standard connectors (150), which facilitate communication and power transfer between other tools in a logging tool string or to a telemetry cartridge which may communicate with a surface system via a wireline cable or other communication interface.

Figure 3:
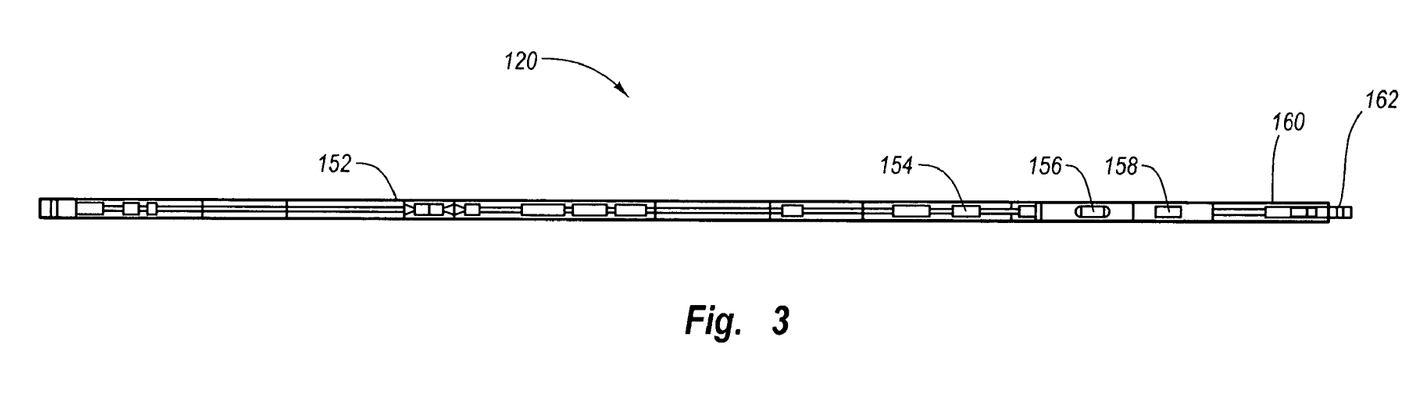
FIG. 3 is a front cut-away view of a transmitter module of the tool shown in FIG. 2.

As shown in FIG. 2, the sonic logging tool (118) preferably includes the transmitter section (120), which is shown in more detail in FIG. 3. According to FIG. 3, the transmitter section (120) includes an electronics module (152), an oil volume compensator (154), and an acoustic source. According to FIG. 2, the acoustic source includes a first dipole source (156), a second dipole source (158), and a monopole source (160). The dipole sources (156, 158) may comprise sources described in U.S. Pat. No. 6,474,439, which is hereby incorporated in its entirety by this reference, or other dipole sources. The monopole source (160) may comprise the source described in U.S. Pat. No. 5,036,945, which is hereby incorporated in its entirety by this reference, or by another monopole source. The transmitter section (120) also includes a feed thru 162 to facilitate power and communication to and from the transmitter section (120) or other components of the sonic logging tool (118, FIG. 2).

Figure 4:
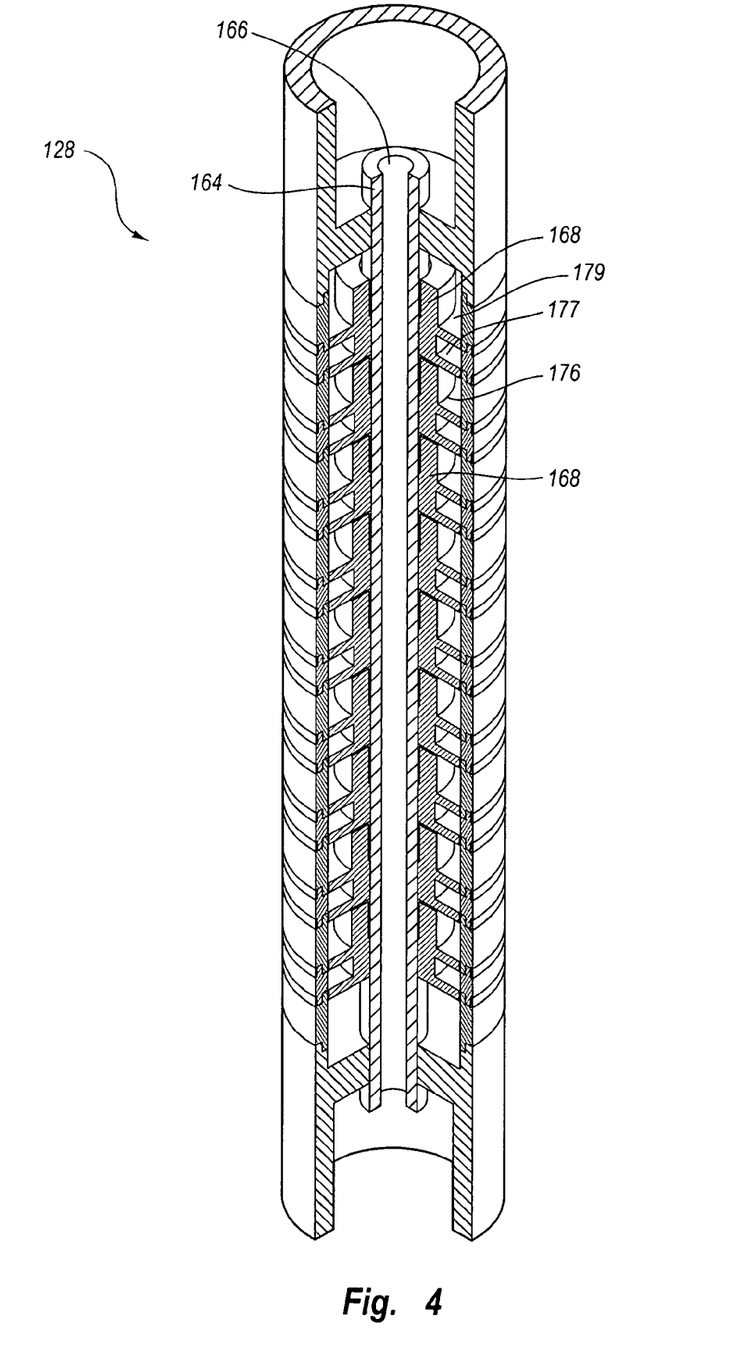
FIG. 4 is a quarter section of the receiver section of the tool shown in FIG. 2 without any receiver elements.

Referring next to FIG. 4 a sectional view of the receiver sonde (128) is shown in more detail (without any receiver elements for clarity). The receiver sonde (128) comprises a mandrel for providing tensile, compressive, and torsional strength. According to the embodiment of FIG. 4, the mandrel is a rigid, central titanium shaft (164) with an internal passageway (166). The central titanium shaft (164) may also comprise other rigid materials. The internal passageway (166) may provide a wiring conduit facilitating power and/or communication transfer between the receiver sonde (128) and the surface.

Although the central titanium shaft (164) provides strength to the receiver sonde (128), it also provides an undesirable acoustic wave propagation medium. Therefore, in order to reduce, eliminate, or clearly distinguish tool arrivals through the central titanium shaft (164), a plurality of mass blocks is mounted to the central titanium shaft (164). According to the embodiment of FIG. 4, the mass blocks comprise receiver blocks (168). The receiver blocks (168) are described in more detail below with reference to FIGS. 7A-7B. Preferably, the receiver blocks (168) comprise a metal such as steel. The geometry of the central titanium shaft (164) and the receiver blocks (168), along with the material properties of each (e.g. Young's modulus, Poisson's ratio, and density) modify wave propagation along the central titanium shaft (164) such that tool arrivals are eliminated or easily identified and filtered. The receiver blocks (168) are preferably rigidly mounted to the central titanium shaft (164) by an interference fit, a weld, or some other rigid mounting means. For example, the receiver blocks (168) may have an inside diameter that is nominally smaller than an outside diameter of the central titanium shaft (164). The receiver blocks (168) may be heated to expand the inside diameter, placed over the central titanium shaft (164), and then allowed to cool such that the inside diameter bears against the outside diameter of the central titanium shaft (164) in an interference fit. The spacer (126, FIG. 2) may also include a similar or identical configuration including a mandrel and multiple mass blocks as described in WO 02/41034 (herein incorporated in its entirety by this reference).

The receiver blocks (168) are spaced from one another by a predetermined distance that is preferably precisely controlled. According to some embodiments, the precision of the spacing between the receiver blocks (168) is on the order of 0.0001 m. Neighboring receiver blocks (168) precisely spaced provide a constant receiver spacing and also realize bending strength. Therefore, if the receiver sonde (128) begins to bend, for example, as it passes through a deviated wellbore, spacing between neighboring receiver blocks (168) decreases until the blocks are in contact. Accordingly, bending rigidity increases as the receiver blocks (168) contact one another to prevent the receiver sonde (128) from buckling.

Figure 5:
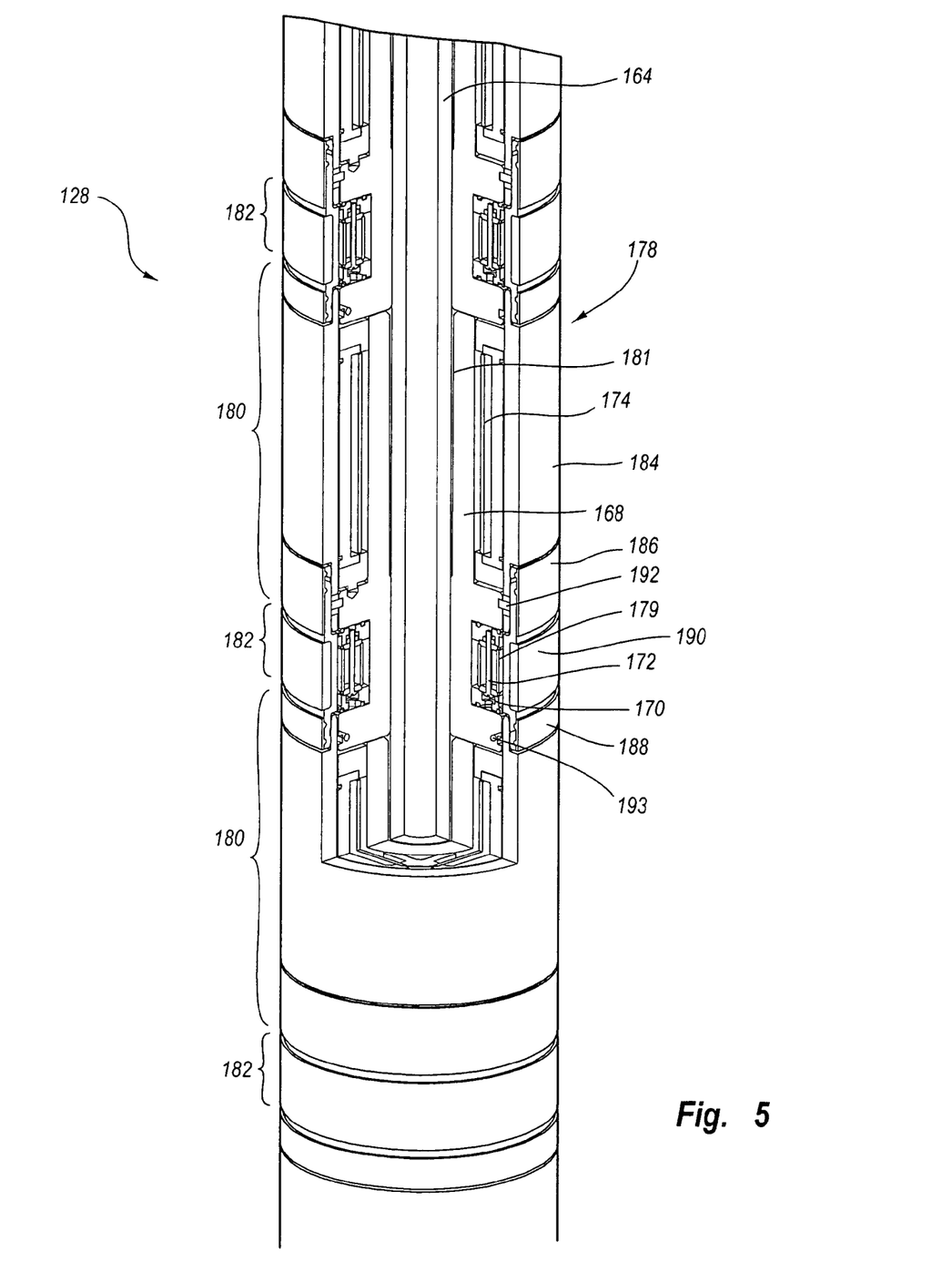
FIG. 5 is partial cut-away view of the receiver section of the tool shown in FIG. 2 with receiver elements in place.

The receiver blocks (168) each include one or more receiver mountings (170) receptive of acoustic receivers (172) as shown in FIG. 5. The receiver mountings (170) may be made of resin and/or elastomer. One or more of the receiver mountings (170) carry a circumferential array of the acoustic receivers (172) spaced around the periphery thereof. The acoustic receivers (172) are preferably in direct contact with the elastomer of the receiver mountings (170). The attachment of the acoustic receivers (172) to the receiver blocks (168) via the elastomer of the receiver mountings (170) minimizes stress generation between the acoustic receivers (172) and the receiver mountings (170), and also resists mechanical shock and vibration. Receiver sonde electronics (174) are housed and mounted in cavities (176, FIG. 4) formed by two neighboring receiver blocks (168).

According to the embodiment of FIG. 5, one diametrically opposed pair of receiver elements (172) at each station or receiver block (168) is rotationally aligned with a respective one of the dipole sources (156, 158, FIG. 3). According to the embodiment shown, there are eight receiving elements (172) in one or more of the receiver mountings (170). Nevertheless, it will be understood by those of skill in the art having the benefit of this disclosure that the number of receiver stations and receiver elements (172) per station can be changed to any number according to requirements and preferences.

The receiving elements (172) are preferably piezoelectric pressure sensors, such as a piezoelectric cylinder with end caps connected by a screw extending through the cylinder. The receiving elements (172) may also include a polarized stack of piezoelectric plates attached to one another by a fastener, or separated from one another by electrodes. Other embodiments of the receiving elements (172) may also be used, as the description above is not limiting but merely exemplary.

The receiving elements (172) and receiver sonde electronics (174) are isolated from borehole environments by an outer sleeve (178). An annulus (179) between the central titanium shaft (164) and the outer sleeve (178) may be filled with oil, preferably with an oil comprising an acoustic impedance substantially matching the borehole fluid and balancing the hydrostatic pressure inside and outside of the outer sleeve (178).

The outer sleeve (178) has two or more alternating zones (180, 182) of high and low acoustic impedance. According to some embodiments, the high acoustic impedance zones (180) have an acoustic impedance at least twice as high as the low acoustic impedance zones (182). Preferably, the acoustic impedance of the high acoustic impedance zones (180) is at least five times as high as the low acoustic impedance zones (182). More preferably, the acoustic impedance of the high acoustic impedance zones (180) is at least ten times as high as the low acoustic impedance zones (182). Although many alternating zones (180, 182) are shown FIGS. 4-5, the alternating zones may only alternate between a single high acoustic impedance zone (180) and a single low acoustic impedance zone (182).

As shown in FIGS. 4-5, the high and low acoustic impedance zones (180, 182) may comprise alternating bands or segments of high and low acoustic impedance. For example, first, second, and third segments (184, 186, 188) may each comprise a high acoustic impedance, and a fourth band (190) may comprise a low acoustic impedance. According to the embodiment shown, the alternating segments are circumferentially continuous, but axially discontinuous at interfaces between the first and fourth segments (184, 190).

Figure 6A:
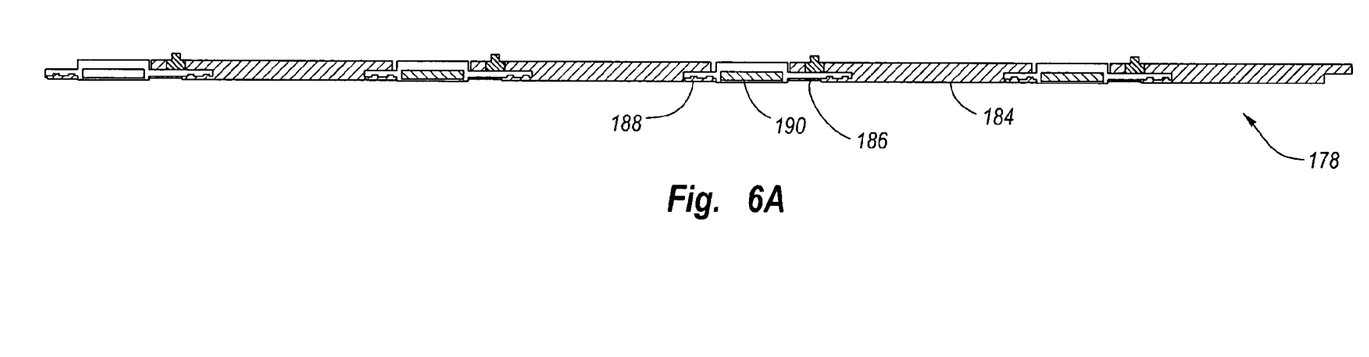
FIG. 6A is a cross-section of one side of a sleeve of the receiver section of the tool shown in FIG. 2.
Figure 6B:
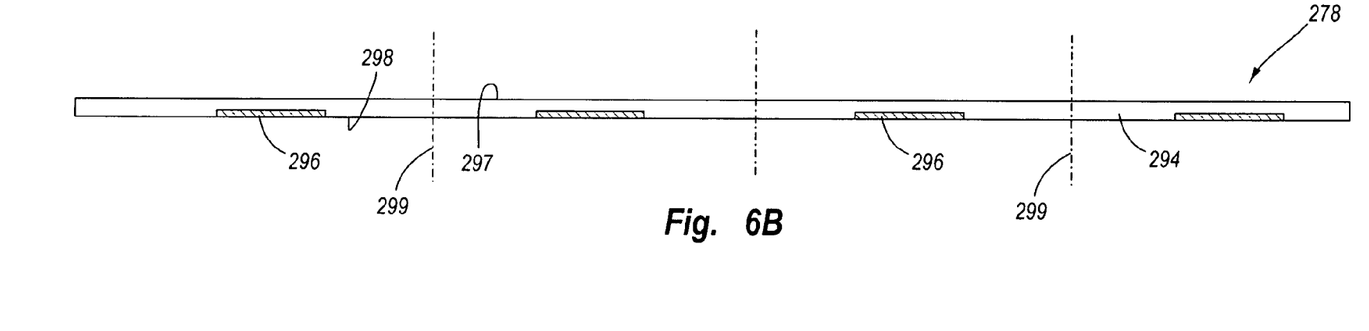
FIG. 6B is a cross-section of one side of a sleeve of a receiver section of an acoustic tool according to another embodiment of the present invention.

According to the embodiment shown in FIGS. 4-6A, the outer sleeve (178) comprises multiple modules, each including the four repeating segments (184, 186, 188, 190). The four repeating segments (184, 186, 188, 190) are most easily distinguished in FIG. 6A. The repeating segments (184, 186, 188, 190) are detachable such that each one can be replaced or repaired during periodic maintenance or repair of the sonic logging tool (118, FIG. 2). The first segment (184) preferably comprises a first hollow metallic cylinder coaxial with the central titanium shaft (164). The first segment (184) abuts against and attaches to the second segment (186). The second segment (186) comprises a first supporting ring coaxial with the first segment (184). The third segment (188) is also a supporting ring and is coaxial with the first and second segments (184, 186). However, the third segment is axially spaced from the second segment (186). The second and third segments (186, 188) are preferably metallic. The fourth segment (190) is a second hollow cylinder sandwiched between, supported by, and coaxial with the second and third segments (186, 188). The fourth segment (190) is preferably non-metallic and may be made of elastomer, resin, or both elastomer and resin depending on targeted formation slowness. Outer surfaces of each segment (184, 186, 188, 190) are substantially flush with one another and have no sharp variations in diameter over approximately 5.0 mm. Accordingly, the outer surface of the outer sleeve (178)

is acoustically smooth, where smoothness refers to a change in radius along a longitudinal receiver sonde (128) axis relative to the wavelength or annular space between the outer sleeve (178) and a borehole wall. An acoustically smooth outer surface of the outer sleeve (178) reduces interference between the receiver sonde (128) and fluid-coupled modes, such as leaky compressional and Stoneley modes for monopole logging, and flexural mode for dipole logging.

The fourth segment (190) is used as an acoustically transparent window for the acoustic receivers (172). Accordingly, the fourth segment (190) is axially aligned with the receiver mountings or stations (170) and therefore the acoustic receivers (172). A pair of split rings may be used to ensure proper alignment. For example, a lock ring (192) is used according to the present embodiment to position the outer sleeve (178) relative to the central titanium shaft (164). In addition, an O-ring (193) centers the outer sleeve (178) with respect to the central titanium shaft (164). The split rings may be disposed in recesses in the first segment (184) and/or the receiver blocks (168) to ensure both axial and azimuthal alignment of the outer sleeve (178) with respect to the central titanium shaft (164) and therefore the acoustic receivers (172). The fourth segment (190) has an acoustic impedance similar to the borehole fluid and the oil in the annulus (179) so as to be acoustically transparent. The fourth segment (190) may also be compliant to facilitate the transmission of acoustic energy from borehole fluid to the annulus (179) oil. Those of skill in the art having the benefit of this disclosure can design the acoustically transparent fourth segments (190) by matching the acoustic impedance of the fourth segments (190) with the acoustic impedance of the borehole fluid. Shear modulus and geometry are key parameters to the design of the fourth segment (190) and may change from one borehole application to another, but the fourth segment (190) design would nevertheless be a routine undertaking by the skilled artisan having the benefit of this disclosure. The acoustic impedance of resin, elastomer, and borehole fluid will typically be in the range of approximately 1-3 MRayl.

On the other hand, the first segment (184) made of metal has a high acoustic impedance which may range between approximately 27 and 46 MRayl. Therefore, the first segment (184) is acoustically opaque and comprises a shield or filter that isolates the acoustic receivers (172) from acoustic noise generated, for example, in the cavities (176, FIG. 4) housing the receiver sonde electronics (174) and an annulus (181) between the receiver blocks (168) and the central titanium shaft (164). The first segment (184) also reduces interference between tool cavities and Stoneley wave modes excited in open hole environments. Further, by connecting the fourth segment (190) comprising a low acoustic impedance with the first segment (184) comprising a high acoustic impedance (with support from the second and third segments (184, 186) according to the embodiment of FIG. 5), the outer sleeve (178) prevents continuous acoustic wave propagation along the longitudinal receiver sonde (128) axis by acoustic wave scattering at the material boundaries or interfaces.

As shown in FIGS. 4-6A, the sequence of four segments (184, 186, 188, 190) may be repeated any number of times to form the modular outer sleeve (178). Therefore, there may be a third hollow metallic cylinder, third and fourth support rings, and a fourth hollow cylinder of elastomer and/or resin, etc.

Although the outer sleeve (178) is shown in FIGS. 4-6A as a combination of four repeating segments (184, 186, 188, 190), other embodiments of the outer sleeve (178) may also be used. For example, referring to FIG. 6B, a cross-section of one side of an alternative outer sleeve (278) is shown. According to FIG. 6B, the outer sleeve (278) comprises a single elastomeric and/or resin pipe (294) with at least two metallic rings (296) attached thereto. According to some embodiments, the metallic rings (296) comprise steel. As shown in FIG. 6B, the metallic rings (296) are recessed into an internal surface (298) of the pipe (294) at a spacing above and below the receiver alignment (indicated by a line (299)). Alternatively, the metallic rings (296) may not be recessed and may instead be adhered as a protrusion from an external surface (297). The metallic rings (296) could likewise be recessed in the external surface (297). If the metallic rings (296) are arranged to protrude from the external surface (297), limiting the thickness of the rings (296) to less than 5.0 mm, and preferably about 2.0 to 3.0 mm, will provide an acoustically smooth surface. The pipe (294) thus provides a low acoustic impedance zone at all places other than the locations of the metallic rings (296). Further, the interfaces between the metallic rings (296) and the pipe (294) prevent acoustic wave propagation.

Figure 7A:
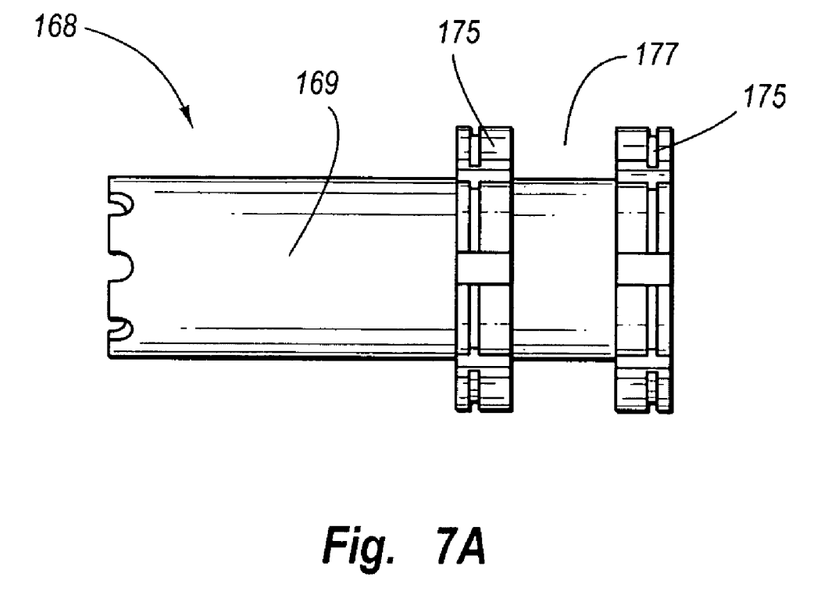
FIG. 7A is a front view of a mass block used in the receiver section according to one embodiment of the present invention.
Figure 7B:
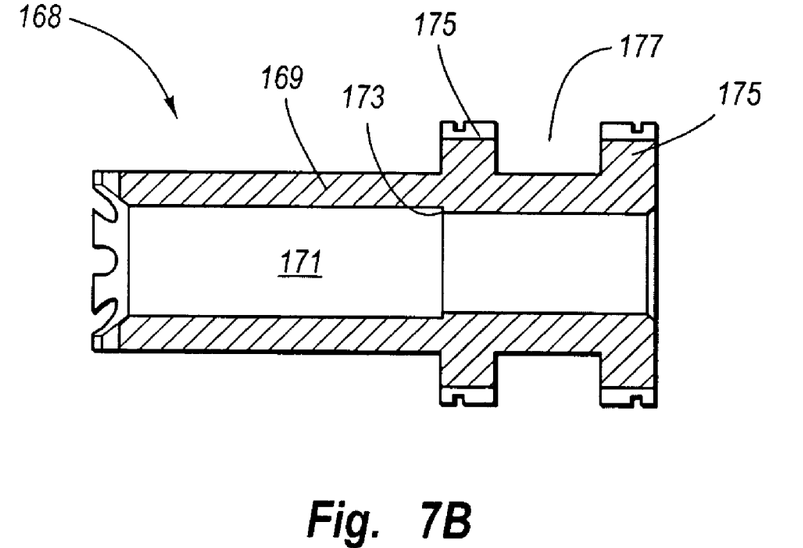
FIG. 7B is a cross-section of the mass block shown in FIG. 7A.

Turning now to FIGS. 7A-7B, front and cross-sectional views of one embodiment of the receiver blocks (168) are shown in more detail. The receiver blocks (168) comprise a tubular body (169) having a bore (171) extending therethrough. The bore (171) includes a step (173) at which the bore (171) decreases in diameter and bears against the outer surface of the central titanium shaft (164, FIG. 4) when mounted thereon. A pair of spaced protruding ridges (175) provides the receiver mount cavity (177). Other receiver blocks may be used according to principles of the present invention with a sonic logging tool as well.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A downhole acoustic tool apparatus comprising:
   an acoustic source;
   an acoustic receiver section; the acoustic receiver section comprising:
      a central mandrel; and
      an outer sleeve configured to isolate receiving elements and electronics of the acoustic receiver section from borehole environments, the outer sleeve having alternating zones of high and low acoustic impedance, the high and low acoustic impedance differing by at least a factor of two.

2. The tool of claim 1, further comprising one or more acoustic receivers attached to the mandrel and housed by the outer sleeve.

3. The tool of claim 1, further comprising oil disposed in an annulus between the central mandrel and the outer sleeve, the oil comprising an acoustic impedance matched to borehole fluid.

4. The tool of claim 3, wherein the oil is pressurized to match a borehole environment.

5. The tool of claim 1, wherein the alternating zones comprise bands having different acoustic impedance.

6. The tool of claim 5, wherein the bands comprise separate, circumferentially continuous bands.

7. The tool of claim 1, wherein the alternating zones comprise a plurality of circumferentially continuous, axially discontinuous bands.

8. The tool of claim 1, wherein the high and low acoustic impedance differs by at least a factor of 5.

9. The tool of claim 1, wherein the high and low acoustic impedance differs by at least a factor of 10.

10. The tool of claim 2, wherein each low acoustic impedance zone is aligned axially with one or more of the acoustic receivers.

11. The tool of claim 1, wherein each low acoustic impedance zone comprises an acoustic impedance substantially matching borehole fluid.

12. The tool of claim 1, wherein an outer surface of the outer sleeve is acoustically smooth.

13. The tool of claim 1, wherein the mandrel is hollow and defines a wiring conduit.

14. The tool of claim 1, further comprising a plurality of mass blocks attached about the mandrel, wherein one or more acoustic receivers are attached to the mass blocks.

15. The tool of claim 1, wherein the mass blocks comprise an inner diameter bearing against an outer diameter of the mandrel in an interference fit.

16. The tool of claim 1, wherein the outer sleeve comprises a multiple modules, each module including:
a first hollow metallic cylinder,
a first supporting ring coaxial with and attached to the first hollow metallic cylinder:
a second supporting ring coaxial with and spaced axially from the first supporting ring; and
a second hollow cylinder comprising elastomer, resin, or both elastomer and resin disposed between the first and second supporting rings.

17. The tool of claim 16, wherein the outer sleeve comprises a resin pipe with at least two metal rings attached thereto, the at least two metal rings being spaced from one another.

18. The tool of claim 17, wherein the at least two metal rings are disposed in mating recesses along an internal surface of the resin pipe.

19. The tool of claim 17, wherein the at least two metal rings are adhered to and protrude from an internal surface of the resin pipe.

20. The tool of claim 16, wherein the outer sleeve comprises an elastomeric pipe with at least two metal rings attached thereto, the at least two metal rings being spaced from one another.

21. The tool of claim 16, wherein the first and second cylinders are separable for maintenance and repair.

22. A sonic receiver sonde comprising:
a mandrel;
a plurality of spaced mass blocks attached to the mandrel;
a plurality of sonic receivers disposed in at least one of the plurality of spaced mass blocks; and
an outer sleeve covering the plurality of spaced mass blocks and sonic receivers to isolate the mass blocks and sonic receivers from borehole environments, the outer sleeve comprising first and second zones, the first zone comprising an acoustic impedance at least twice as high as the second zone.

23. The sonic receiver sonde of claim 22, wherein the first zone comprises an acoustic impedance at least five times as high as the second zone.

24. The sonic receiver sonde of claim 22, wherein the first zone comprises an acoustic impedance at least ten times as high as the second zone.

25. The sonic receiver sonde of claim 22, wherein the second zone is substantially acoustically transparent.

26. The sonic receiver sonde of claim 22, wherein the second zone is axially aligned with the plurality of sonic receivers.

27. The sonic receiver sonde of claim 22, further comprising a plurality of alternating first and second zones.

28. The sonic receiver sonde of claim 27, wherein the plurality of sonic receivers is disposed in at least two of the spaced mass blocks, and wherein each of the plurality of sonic receivers is axially aligned with one of the second zones.

29. The sonic receiver sonde of claim 22, wherein the first and second zones comprise alternating circumferentially continuous bands.

30. The sonic receiver sonde of claim 29, wherein the first zone comprises a metal band and the second zone comprises an elastomeric band.

31. The sonic receiver sonde of claim 30, wherein the metal and elastomeric bands are separable for maintenance and replacement.

32. The sonic receiver sonde of claim 28, wherein the first zone comprises a steel band and the second zone comprises a plastic band.

33. The sonic receiver sonde of claim 30, wherein an outer surface of the outer sleeve is acoustically smooth relative to a wavelength of sonic signals received by the sonic receivers.

34. The sonic receiver sonde of claim 22, wherein the outer sleeve comprises a plurality of sleeve modules.

35. The sonic receiver sonde of claim 34, wherein each of the sleeve modules comprises:
a first hollow metallic cylinder;
a second hollow cylinder comprising elastomer, resin, or both elastomer and resin; and
first and second supporting rings.

36. The sonic receiver sonde of claim 22, wherein the outer sleeve comprises a resin pipe with at least two metal rings attached thereto, the at least two metal rings being spaced from one another.

37. A sonic receiver sleeve comprising:
a first hollow metallic cylinder,
a first supporting ring coaxial with and attached to the first hollow metallic cylinder;
a second supporting ring coaxial with and spaced axially from the first supporting ring; and
a second hollow cylinder sandwiched between the first and second supporting rings, and comprising an acoustic impedance matched to an acoustic impedance of a borehole fluid,
wherein the sonic receiver sleeve comprises zones having different acoustic impedance and is configured to encase sonic receivers of a sonic logging tool to isolate the sonic receivers from borehole environments.

38. The sonic receiver sleeve of claim 37, further comprising:
a third hollow metallic cylinder attached to the second supporting ring opposite of the second hollow cylinder;
a third supporting ring coaxial with and attached to the third hollow metallic cylinder;
a fourth supporting ring coaxial with spaced axially from the third supporting ring; and a fourth hollow cylinder comprising elastomer, resin, or both elastomer and resin disposed between the third and fourth supporting rings.

39. The sonic receiver sleeve of claim 38, wherein the second and fourth hollow cylinders are aligned with the sonic receivers of the sonic logging tool.

40. The sonic receiver sleeve of claim 38, wherein the first and third hollow metallic cylinders each comprise an acoustic impedance at least twice as high as the second and fourth hollow cylinders.

41. The sonic receiver sleeve of claim 38, wherein the first and third hollow metallic cylinders each comprise an acoustic impedance at least ten times as high as the second and fourth hollow cylinders.

42. An acoustic receiver sonde comprising:
a central rigid mandrel;
a plurality of spaced receiver blocks rigidly attached to the mandrel;
a plurality of acoustic receivers attached to each of the plurality of spaced receiver blocks; and
a plurality of axially discontinuous, circumferentially continuous acoustic impedance zones encasing the plurality of spaced receiver blocks and acoustic receivers to isolate the receiver blocks and acoustic receivers from borehole environments.

43. The acoustic receiver sonde of claim 42, wherein alternating zones differ in acoustic impedance by at least a factor of two.

44. The acoustic receiver sonde of claim 42, wherein alternating zones differ in acoustic impedance by at least a factor of five.

45. The acoustic receiver sonde of claim 42, wherein alternating zones comprise steel and elastomeric rings.

46. The acoustic receiver sonde of claim 42, wherein alternating zones comprise steel and resin rings.

47. The sonic receiver sleeve of claim 37, wherein the second hollow cylinder comprises elastomer, resin, or both elastomer and resin.

* * * * *